May 15, 1951  A. L. GOURLEY  2,553,367
BICYCLE DRIVE MECHANISM
Filed March 26, 1948

Alden L. Gourley
INVENTOR.

BY Alex. E. MacRae
Attorney.

Patented May 15, 1951

2,553,367

UNITED STATES PATENT OFFICE 2,553,367

BICYCLE DRIVE MECHANISM

Alden L. Gourley, Kingston, Ontario, Canada

Application March 26, 1948, Serial No. 17,351

4 Claims. (Cl. 180—33)

This invention relates to driving mechanisms for bicycles and the like.

It has heretofore been proposed to provide motor driving means for attachment to bicycles to augment or replace the usual foot pedal driving means. However, such motor-driven attachments are usually of complicated structure and require mechanical changes in the bicycle structure as well as skilled mechanical labor in the installation thereof.

An object of the present invention is to provide a power-driving mechanism of relatively simple structure and arrangement, which may be quickly and conveniently installed on bicycles of various types with substantially no change in the normal bicycle structure and with a minimum of effort and skill.

The invention contemplates the provision of a prime mover or motor, a driven sprocket, means for clamping the sprocket to a normal rear wheel hub, and means for drivably connecting and disconnecting the motor with the sprocket.

Figure 1:
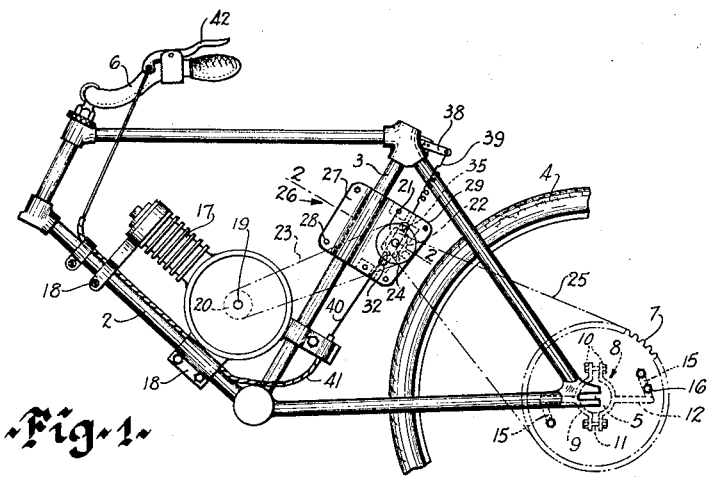
Figure 2:
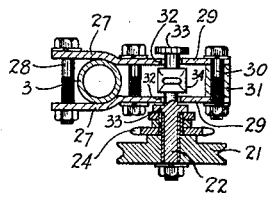
Figure 4:
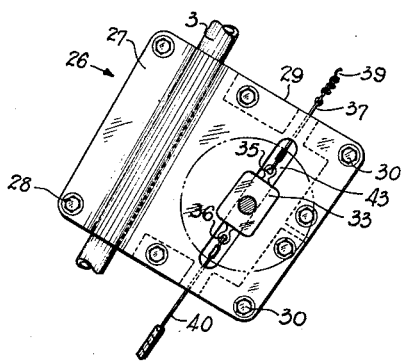
Figure 3:
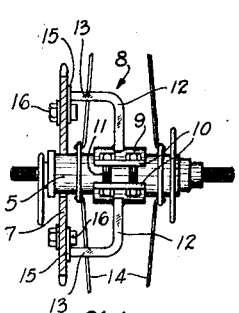

The invention will be described with reference to the accompanying drawing, in which Figure 1 is a side elevation of a mechanism in accordance with the invention as installed on a bicycle of normal type, Figure 2 is a section on line 2—2 of Figure 1, Figure 3 is a plan view of a sprocket clamping means, and Figure 4 is an enlarged side elevation of a modified form of jackshaft mounting means.

In the drawing, the bicycle shown includes the usual related parts comprising rear frame members 1, lower forward frame member 2, intermediate upwardly extending frame member 3, rear wheel 4 supported on hub 5, and handle bar 6.

In accordance with the invention, a driven sprocket 7 is adapted to be mounted on the rear wheel hub 5 by means of a universal clamping bracket 8. The bracket comprises a two-part hub embracing ring 9 having outwardly extending complementary ears 10 through which bolts 11 are adapted to extend to clamp the parts together on the hub. As shown in Figure 3, the ring is adapted to be mounted on the central portion of the hub. Fixed to each part of the ring is a bar 12 which extends radially outwardly therefrom. Each bar has an end portion 13 which extends substantially right-angularly from the main portion of the bar and through the spokes 14 of the wheel. Fixed to the end of each portion 13 is a plate 15 to which the sprocket 7 is fixed as by means of bolts 16. It will be observed that the sprocket 7 fits over one end of the hub 5. Thus, by means of the bracket described, the sprocket 7 may be quickly and readily mounted on the hub to constitute a driving means therefor. No change in the hub assembly is required and a wrench is the only tool necessary to effect the mounting.

An internal combustion motor 17 of any suitable type may be mounted on the frame member 2 by means of brackets 18.

Means for drivably connecting the motor shaft 19 with the sprocket 7 comprises a pulley 20 on the motor shaft adapted to drive a pulley 21 on a jackshaft 22 as by means of a V-belt 23. A sprocket 24 fixed to the jackshaft drives the sprocket 7 as by means of a chain 25.

Clutch means for disconnecting the driving engagement between the drive shaft 19 and sprocket 7 and drivably connecting the same at the will of the operator preferably comprises means for loosening and tightening the belt 23 by oscillation of the jackshaft 22. It will be appreciated that upward movement of the jackshaft will act to tighten the belt for driving connection of the pulleys 20 and 21 while downward movement of the jackshaft will loosen the belt to permit slippage of the pulley 20 thereon.

While various mounting means for the jackshaft to permit oscillation thereof may be provided, that shown is particularly well adapted for the purpose. As shown, a mounting 26 is provided and comprises a pair of spaced complementary plates 27 adapted to be clamped to frame member 3 as by means of bolts 28. The plates have rearwardly extending portions 29 bolted together by bolts 30 and maintained in spaced relation by spacer members 31. The portion 29 have aligned slots 32 therein. As shown in Figure 1, the slots 32 are curved about a radius the center of which is coincident with the axis of the rear wheel 4. Jackshaft 22 extends through the slots for reciprocation therein and is provided with flanges 33 to prevent lateral movement thereof.

A block 34 is journalled on the shaft between the plates and is provided with upper and lower eyes 35 and 36. A link or cable 37 is connected to eye 35 and to a lug 38 fixed to the frame through a spring 39, which is adapted resiliently to hold the jackshaft in upper or belt-tightened and drivably connected position. A cable 40 is connected to the lower eye 36 and leads through a conduit 41 to a lever 42 mounted on the handle bar 6. It will be observed that the lever may be manually actuated to exert a downward pull on the block 34 through the cable and thus move the jackshaft downwardly against the action of spring 39 to loosen the belt and disconnect the jackshaft from driven engagement with the motor shaft. On release of the lever, the spring 39 will automatically result in resumption of the driven engagement.

Figure 4 shows a slightly modified form of jackshaft mounting wherein slots 43, corresponding to slots 32, have straight instead of curved side walls.

What is claimed is:

1. A driving mechanism for a bicycle having a frame, a rear wheel mounted thereon, and a hub for the rear wheel, comprising a motor having a driving shaft mounted on the frame, a sprocket, a bracket for clamping the sprocket to said hub in axial relation thereon, and means for drivably connecting said driving shaft and sprocket including a jackshaft, a bracket clamped to the frame and having a slot therein, said jackshaft being oscillatingly mounted in said slot, pulleys on said driving shaft and jackshaft, a belt connecting said pulleys, a sprocket fixed to the jackshaft, a chain connecting said two sprockets, spring means biasing said jackshaft in a direction to tighten said belt and drivably connect said pulleys, and manually actuatable means for moving the jackshaft in the opposite direction to loosen said belt and disconnect the driving connection of said pulleys.

2. A bicycle driving mechanism as defined in claim 1, wherein said slot is curved about a radius having a center coinciding with the axis of said hub.

3. In a driving mechanism for a bicycle having a frame, and a rear wheel mounted therein and having a hub and two laterally spaced series of spokes mounted on the hub, power means mounted on the frame, a sprocket, means for mounting the sprocket on the hub including a two-part ring clamped to the hub between and midway between the sides thereof the two series of spokes, a pair of longitudinally aligned bars each having one end anchored on a respective part of the ring midway between the ends thereof, each bar having an angular portion extending laterally of the ring and freely through one of said series of spokes, and means securing the end of each said angular portions to said sprocket in fixed relation thereto, and means for drivably connecting said power means and sprocket.

4. In a driving mechanism for a bicycle having a frame, and a rear wheel mounted therein and having a hub and two laterally spaced series of spokes mounted on the hub, power means mounted on the frame, a sprocket, means for mounting the sprocket on the hub including a two-part ring clamped to the hub between and independently of the two series of spokes, a pair of longitudinally aligned bars each having one end anchored on a respective part of the ring midway between the ends thereof and midway between the sides thereof, each bar having its anchored end portion extending radially outwardly from the hub and an outer portion extending at substantially right angles to said radial portion and freely through one of said series of spokes, a plate extending angularly from and having one end secured to the end of each said angular portion outwardly of said series of spokes, said plates being in diametrically opposite relation and having plane side surfaces each engaging a minor portion only of diametrically opposite segmental areas of the side surface of the sprocket, and means bolting each said plate to the sprocket, and means for drivably connecting said power means and sprocket.

ALDEN L. GOURLEY.

REFERENCES CITED

The following references are of record in the file of this patent:

UNITED STATES PATENTS

| Number | Name | Date |
|---|---|---|
| 308,588 | Yagn | Nov. 25, 1884 |
| 729,197 | Mathieu | May 26, 1903 |
| 1,257,711 | Johnson | Feb. 26, 1918 |
| 1,460,811 | Caleno | July 3, 1923 |